Patented June 26, 1934

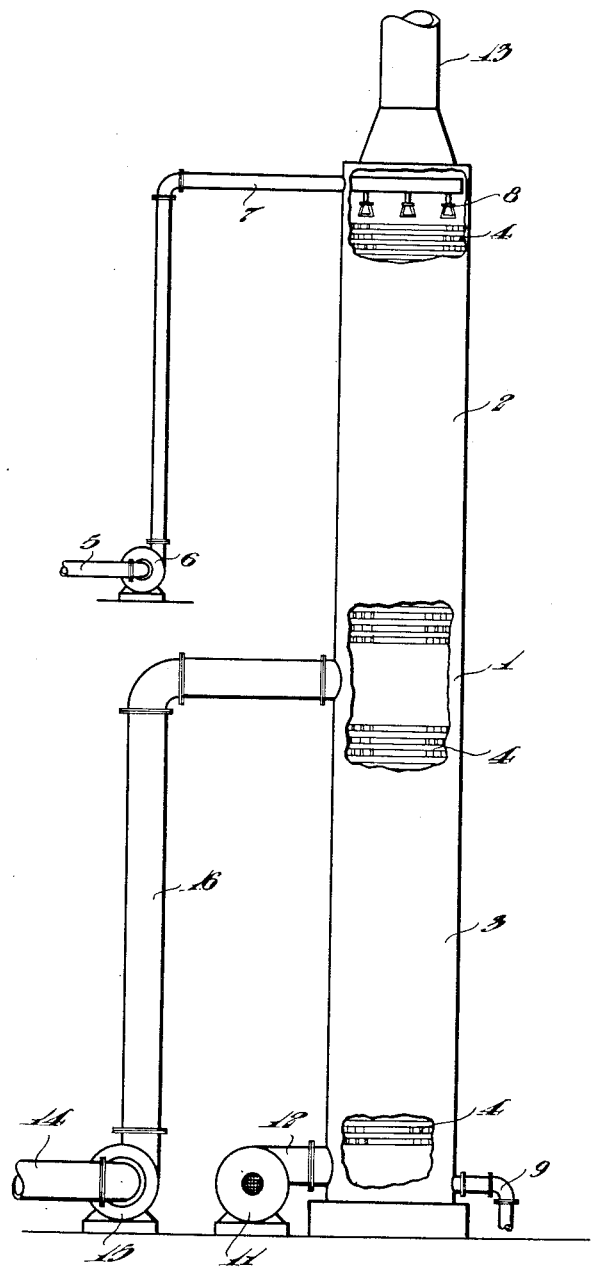

1,964,487

UNITED STATES PATENT OFFICE 1,964,487

PROCESS OF PURIFYING LIQUIDS

Charles J. Smith, Pittsburgh, Pa., assignor to The Koppers Company of Delaware, a corporation of Delaware Application September 23, 1929, Serial No. 394,431

3 Claims. (Cl. 210—16)

My invention relates to the purification of liquids and more particularly to the treatment of aqueous liquids containing sulphur in solution for the removal of this impurity.

In various industries large amounts of aqueous liquids or waste waters are produced which contain sulphur in solution principally as sulphide or polysulphide or in an analogous form sufficient in amount to make the disposition of this water difficult or its use for various purposes impossible unless its purification from sulphur is effected.

Not only does the dissolved sulphur impart to the liquid a disagreeable taste and odor but it may also render the liquid corrosive or subject it to the action of bacterial or chemical change which results in imparting an acid reaction to the water that is in many instances undesirable.

On the other hand, the quantities of liquid involved may be very large and this, in view of the fact that the sulphur concentration need not be high to result thus disadvantageously, makes the sulphur purification of such liquids at a reasonable cost a difficult problem.

For example, in mining sulphur in the manner practiced on a tremendous scale in this country and involving the melting and forcing of the sulphur (see United States patent to Judson, 1,719,981) to the surface with large quantities of superheated water, so-called "bleed water" is produced in enormous quantities, for example, several million gallons per day in a single mining operation. The treatment of this large amount of water is rendered extremely difficult by the fact that no useful product can economically be made from the impurities and in common with other "nuisance operations" the purification must necessarily be conducted at extremely low cost with relation to the large quantities involved.

An object of the present invention is to provide an improved method of and apparatus for purifying such liquids from sulphur, which process and apparatus are especially suitable to the ends desired and are simpler and cheaper than methods hitherto employed.

A further object of my invention is to provide an improved method of and apparatus for purifying such liquids from sulphur by treating said liquid with suitable gases in which high back pressures are avoided and excessive gas pressures are not required.

My invention has for other objects such other operating advantages and results as may hereinafter be found to obtain.

Aqueous liquids of the kind above described ordinarily contain sulphur in a relatively limited number of forms. The sulphur may be held in solution as hydrosulphide, as sulphide or polysulphide, as thiosulphate and sulphate of one or more of the alkali-forming metals such as calcium or magnesium of the alkaline earth metals or sodium of the alkali metals. The sulphate is relatively unobjectionable and ordinarily no steps need be taken to remove it but the remaining forms are susceptible of treatment and removal.

The character and concentration of the "bleed-water" varies with the formation water in sulphur mining, and changes with changes in location of the wells occasioned by exhaustion of sulphur in the mine or breaking of the well by subsidence of the ground. The exact composition of "bleed-water" is not known, but it is known that complex soluble sulphides are present in abundance in the "bleed-water" probably as dissolved hydrogen sulphide ($H_2S$), calcium polysulphide ($CaS_5$), calcium hydrosulphides ($Ca(HS)_2$), and additional polysulphides of calcium. Examples of the compositions of some kinds of "bleed-water" are given in Schwab and Butterworth U. S. Patent 1,851,987.

As is pointed out in the copending application of Gilbert A. Bragg and myself, Serial No. 393,260, filed September 17, 1929, liquids of this character may be successfully purified if the sulphur present in non-volatile form, for example, as sulphide, polysulphide, or thiosulphate is first converted into volatile form and the liquid is then aerated or treated with any suitable inert gas under the proper conditions, the sulphur previously rendered volatile being entrained and driven off from the liquid by said inert gas.

By an "inert gas" is meant any gas which does not have an undesirable chemical reaction with the liquid or its constituents interfering with the driving off of the sulphur, and as examples of such a gas I may cite air and nitrogen, being only two of many suitable gases.

It may be noted that the presence of carbon dioxide in the inert gas employed for driving off the sulphur would not in any way interfere with the process by reason of the fact that the liquid is first fully carbonated and consequently such carbon dioxide as contained in the inert gas has no more or less effect than its other constituents.

The carbonation of the liquid may be accomplished with carbon dioxide alone or by means of any gas containing sufficient quantities of carbon dioxide to be feasible for use. Ordinarily I prefer to employ flue gas or gases of combustion which may contain in the neighborhood of 10% by volume of carbon dioxide, as flue gas is generally available to some extent at least and represents a relatively very cheap source of carbon dioxide.

The reaction of the combined sulphides of the sulphur-mining "bleed-water" with carbon-dioxide ($CO_2$) of flue gas in the carbonation phase is a chemical one which may be represented by the following equations:

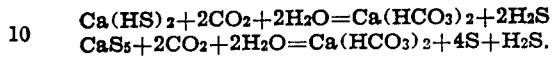

$$Ca(HS)_2 + 2CO_2 + 2H_2O = Ca(HCO_3)_2 + 2H_2S$$
$$CaS_5 + 2CO_2 + 2H_2O = Ca(HCO_3)_2 + 4S + H_2S.$$

The action of the inert gas is physical rather than chemical, that is, the inert gas merely acts to sweep chemically uncombined $H_2S$ out of the water, the inert gas acting as a mere carrier for $H_2S$ and not being chemically united with the $H_2S$ that it carries, since air or $CO_2$ do not react with $H_2S$ in the absence of an intermediary reactant. Thus the excess of an excess of $CO_2$ acts physically and not chemically and so may also be an inert gas which sweeps from the water $H_2S$ held as such in the water after being converted from a non-volatile combination with calcium by $CO_2$ to merely volatile $H_2S$. This sweeping action is a well known and much used phenomenon. (See lines 73—74 of page 2 of Jacobson U. S. Patent 1,390,037.)

In the aforesaid copending application it was shown that in certain instances and especially where the amount of flue gas or other carbon dioxide-containing gas is somewhat limited in amount, it might be desirable to accomplish the carbonation of the liquid by accumulating the liquid in a body and introducing the carbon dioxide gas below the surface of the liquid, this treatment being followed by a stage in which the liquid was passed in finely divided condition through a body of moving inert gas, such as air.

In many instances, however, relatively large quantities of flue gas or other carbon dioxide-containing gas are available but high pressures (such as will be necessitated by passing such a gas through a body of liquid) must be avoided.

Consequently, my invention contemplates the provision of a process and apparatus for effecting purification of such liquids in which high back pressures will be avoided. My invention further contemplates the employment of the inert gas not only in a separate stage from the carbonation stage, but also in the carbonation stage itself.

This is accomplished by establishing a continuous counterflow of the liquid to be treated and an inert gas between two points and introducing carbon dioxide or gas containing it at some intermediate point, the whole being carried out in such a manner that the liquid passes in finely divided form through the moving gases.

In order that my invention may be fully set forth and understood I now describe with reference to the accompanying drawing a preferred manner in which it is practiced and embodied. In this drawing, The single figure is a view partly in elevation and partly in vertical section of apparatus for accomplishing the purification of liquids according to the present invention.

Referring to the drawing, the apparatus consists of a tower 1 which is divided into an upper or carbonating section 2 and a lower section 3. Sections 2 and 3 are filled with appropriate permeable contact means 4, such as for example, spiral tile, wooden hurdles, or the like.

The liquid to be treated is brought from its source through a conduit 5 and delivered by a pump 6 through a conduit 7 and suitable sprays 8 into the top of the tower 1 and is distributed upon and through the contact material 4 within the carbonating section 2. The liquid flows downward by gravity through the tower 1 and after leaving the carbonating section 2 passes downward through the contact material 4 within the lower section 3 and upon reaching the bottom of the tower escapes through a drain 9.

A suitable volume of inert gas such as air is introduced to the bottom of the tower 1 through a blower 11 and a conduit 12 and after passing upward through the entire length of the tower 1, escapes through a stack 13 into the atmosphere or any suitable storage space or it may have such use as may be found for it.

At the same time flue gas or other gas containing carbon dioxide is brought from a suitable source through a conduit 14 and forced by a blower 15 and a conduit 16 into the interior of the tower 1 between the lower section 3 and the upper or carbonating section 2. This gas mingles with the air or other inert gas passing upwardly through the tower 1 and together with said inert gas or air passes upward through the carbonating section 2 and out through the stack 13.

During its passage downward through the carbonating section 2 the liquid is thoroughly carbonated and the hydrogen sulphide which is thus brought into volatile form is carried away from the solution partly in the carbonating section 2 and also in the lower section 3.

The amount of carbon dioxide gas and inert gas employed in the process are ordinarily largely dependent upon the nature of the liquid treated and the results desired. Moreover, since the object of the present invention is to provide a process and apparatus suitable for use when the available amount of carbon dioxide gas is large but high pressures are to be avoided, it will generally be the case that a considerable excess of carbon dioxide-containing gas can be employed without difficulty.

However, as a specific example of my invention, I have found that liquid containing approximately 30 grains of sulphur per gallon may successfully be purified by treating it in this manner by 10 cubic feet or more of flue gas (containing 10% carbon dioxide) per gallon followed by aeration with 10 cubic feet of air per gallon, the air used in the second step being subsequently employed in the initial step.

From this it will be seen that the sulphur-mining "bleed-water", while being treated in the primary carbonation stage 2 for carbonation to release $H_2S$ from chemical combination, as with calcium, by chemical reaction with the $CO_2$ of the flue gas, and while being thereafter treated in a secondary sweeping stage 3 to sweep the so released $H_2S$ from the solution, is also treated in the primary carbonation stage 2 with a volume of gas greatly in excess of that volume whose content of $CO_2$ would suffice for the chemical reactions that release combined $H_2S$ from chemical combination, as with calcium, so that the $H_2S$ is subjected both in the primary carbonation stage 2 as well as in the secondary sweeping stage 3 to sweeping action of inert gas which causes the released $H_2S$ to be simultaneously swept out of the water in the carbonation stage 2 by such excess gas about as fast as the $H_2S$ is released to volatile form. Consequently, with the employment in the carbonation stage of sweep gas in volume such as above specified as a specific example, the "bleed-water" is swept during carbonation in the carbonation stage 2 with such a volume of gas, in excess of an amount whose content of carbon dioxide (CO$_2$) is requisite to effect the carbonation chemical reaction upon greatly the major part of the sulphides in the water, that the H$_2$S is swept out nearly as rapidly as it is released and thereby the continuance of the carbonation reaction in the primary stage 2 promoted. As a result of this secondary sweep stage 3 need function to eliminate substantially all of the minor residual content of sulphur compounds still remainng in the "bleed-water" and may discharge the latter substantially free of sulphides.

It will be obvious to those skilled in the art that my invention is susceptible of being carried out in various ways differing from the specific instance given hereinabove by way of illustrative example, for example, the upper and lower sections 2 and 3 of the tower 1 may be unconnected except as to means for conveying gas and liquid from one to the other or, on the other hand, the entire shape and details of the gas and liquid contact apparatus may be varied at will so long as excessive back pressures are avoided and the liquid is introduced in finely divided form into the moving gas.

Consequently, my invention is not limited to the specific example herein given but may variously be carried out and embodied within the scope of the claims hereinafter made.

I claim as my invention:

1. The process of purifying waste waters of the class described from small amounts of sulphur contained therein in solution which comprises treating the liquid with a gas comprising carbon dioxide to carbonate it and simultaneously subjecting the liquid to sweeping action with an inert gas to sweep out H$_2$S as it is released during the carbonation with the CO$_2$, and then treating the so treated liquid with inert gas alone.

2. The process of purifying sulphided sulphur-mining bleed-water from sulphur impurities contained therein which comprises: subjecting the bleed-water to primary treatment in a primary carbonation stage in which the bleed-water is carbonated by flowing gas containing carbon dioxide through the water to carbonate non-volatile sulphides by chemical reaction with the carbon dioxide with release of the hydrogen sulphide in volatile form, and thereafter subjecting the bleed-water from the primary stage to secondary treatment in a secondary sweep stage in which the bleed-water is swept of volatile hydrogen sulphide by flowing gas through the water in the secondary stage, the amount of gas employed in the primary carbonation stage being of such volume, in excess of an amount whose carbon dioxide is requisite to effect said chemical reaction upon greatly the major part of the sulphides in the water, that the H$_2$S is swept out of the water nearly as rapidly as it is released and thereby the continuance of the reaction promoted in the primary stage, and the amount of gas employed in the secondary sweep stage being of such volume as to eliminate substantially all of the minor residual content of such sulphur compounds still in the water.

3. The process of purifying waste waters of the class described from sulphur contained therein which comprises subjecting the waste water to carbonation by chemical reaction with carbon dioxide that is being passed into such water and simultaneously therewith subjecting the water to sweeping action of air during the carbonation with the CO$_2$ to sweep out H$_2$S as it is released by the chemical reaction of said CO$_2$.

CHARLES J. SMITH.